United States Patent [19]
Knott

[11] Patent Number: 5,895,088
[45] Date of Patent: Apr. 20, 1999

[54] FULL WIDTH SIDE IMPACT BARRIER

[76] Inventor: Ronald W. Knott, P.O. Box 16234, Rochester, N.Y. 14616

[21] Appl. No.: 08/861,638

[22] Filed: May 22, 1997

[51] Int. Cl.$^6$ ...................................................... B60J 7/00
[52] U.S. Cl. .................. 296/188; 296/146.5; 296/146.6; 296/188; 296/189; 296/202
[58] Field of Search ............................ 296/146.5, 146.6, 296/188, 189, 202

[56] References Cited

U.S. PATENT DOCUMENTS

| | | | |
|---|---|---|---|
| 3,718,364 | 2/1973 | Fischer et al. | 296/146.6 |
| 3,887,227 | 6/1975 | Deckert | 296/188 |
| 4,307,911 | 12/1981 | Pavlik | 296/146.6 |
| 4,919,473 | 4/1990 | Laimighofer et al. | |
| 5,137,325 | 8/1992 | Ohya | 296/146.6 |
| 5,180,204 | 1/1993 | Shirasawa et al. | |
| 5,297,841 | 3/1994 | Siedlecki | 296/146.6 |
| 5,314,228 | 5/1994 | Figge, Sr. | 296/146.6 |
| 5,404,690 | 4/1995 | Hanf. | |
| 5,431,476 | 7/1995 | Torigaki | 296/146.6 |
| 5,518,290 | 5/1996 | Reinhard et al. | 296/146.6 |
| 5,553,910 | 9/1996 | Park. | |

FOREIGN PATENT DOCUMENTS

| | | | |
|---|---|---|---|
| 2698322 | 5/1994 | France | 296/146.6 |
| 4125299 | 4/1993 | Germany | 296/146.6 |
| 427619 | 1/1992 | Japan | 296/146.6 |
| 640259 | 2/1994 | Japan | 296/146.6 |

*Primary Examiner*—D. Glenn Dayoan
*Assistant Examiner*—Kiran Patel
*Attorney, Agent, or Firm*—Terrance L. Siemens

[57] ABSTRACT

An impact barrier extending along the entire length of one side of a cabin of a motor vehicle. The impact barrier includes plural constituent barrier segments each protecting a door or a body panel. Barrier segments interlock or interengage neighboring barrier segments or, alternatively, engage fixed anchorage components of the barrier during an impact. Barrier segments remain free of interengagement when no impact occurs, so that doors and hatches may be opened. Each barrier segment connects to its neighboring segment or, alternatively, to an anchorage component of the barrier by hooks. As an alternative to hooks, any suitable male and female interengaging devices may be employed. Anchorage components are permanently fixed to structural elements of the cabin, such as a doorpost or pillar, for anchoring barrier segments during an impact. Barrier segments, which may be rigid or non-rigid, may either be permanently anchored at one end to an anchorage component or alternatively may engage the anchorage component by a hook or an equivalent coupling.

4 Claims, 3 Drawing Sheets

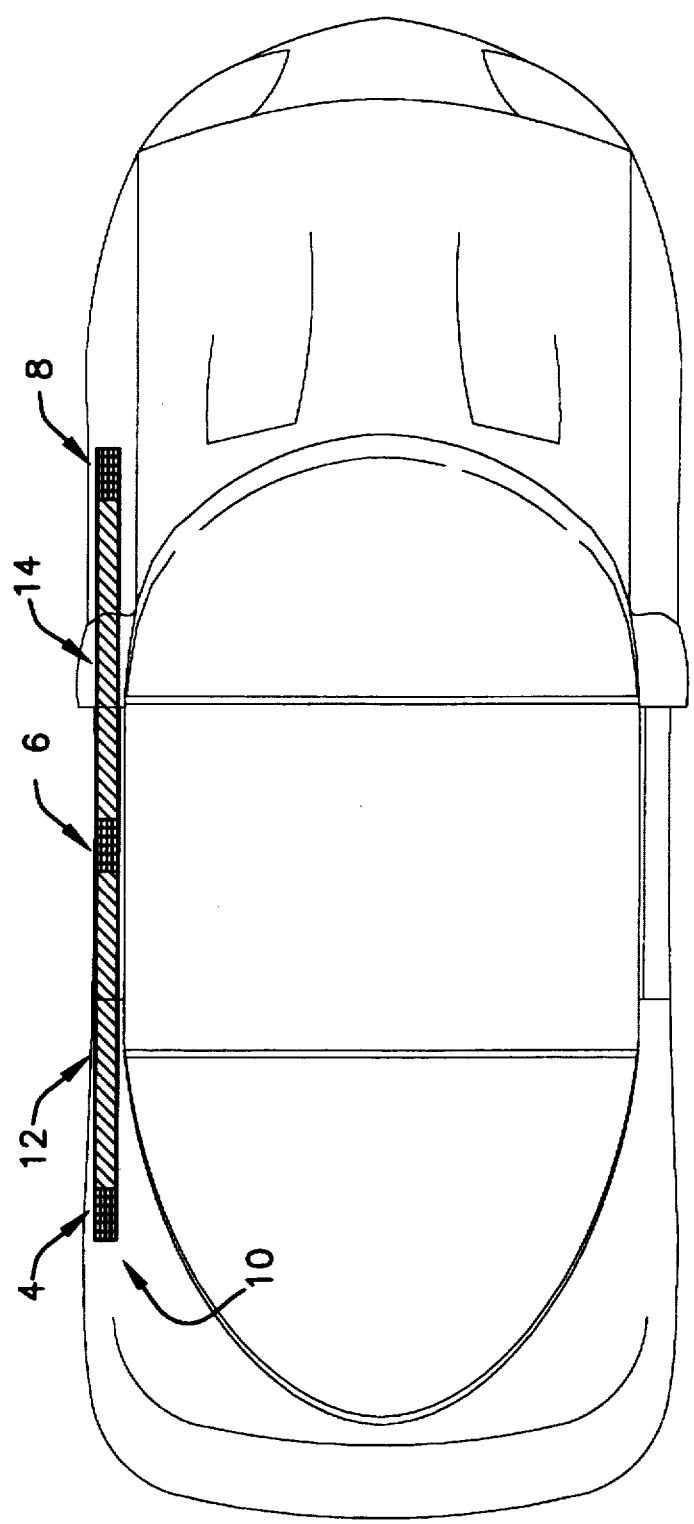
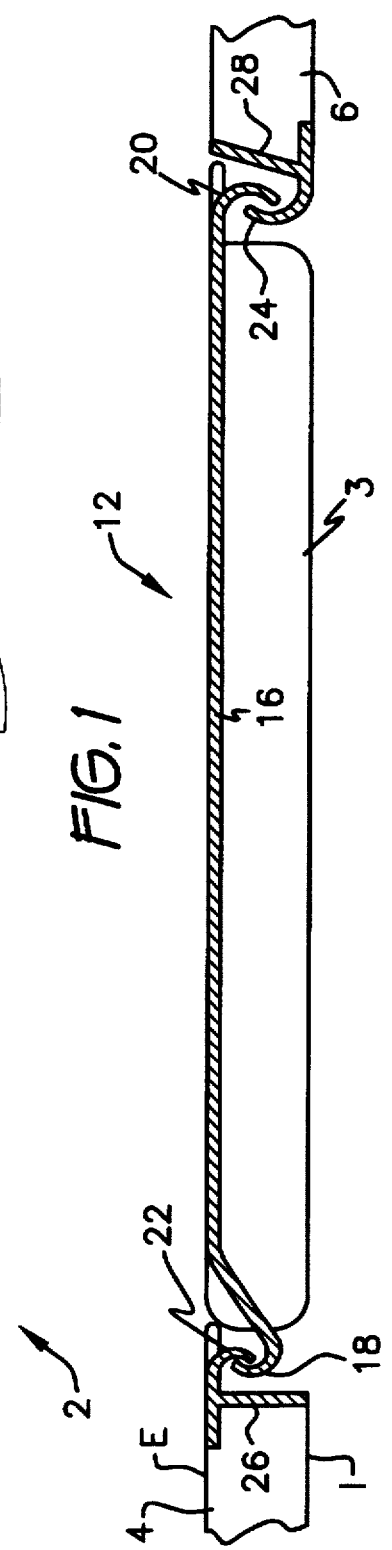

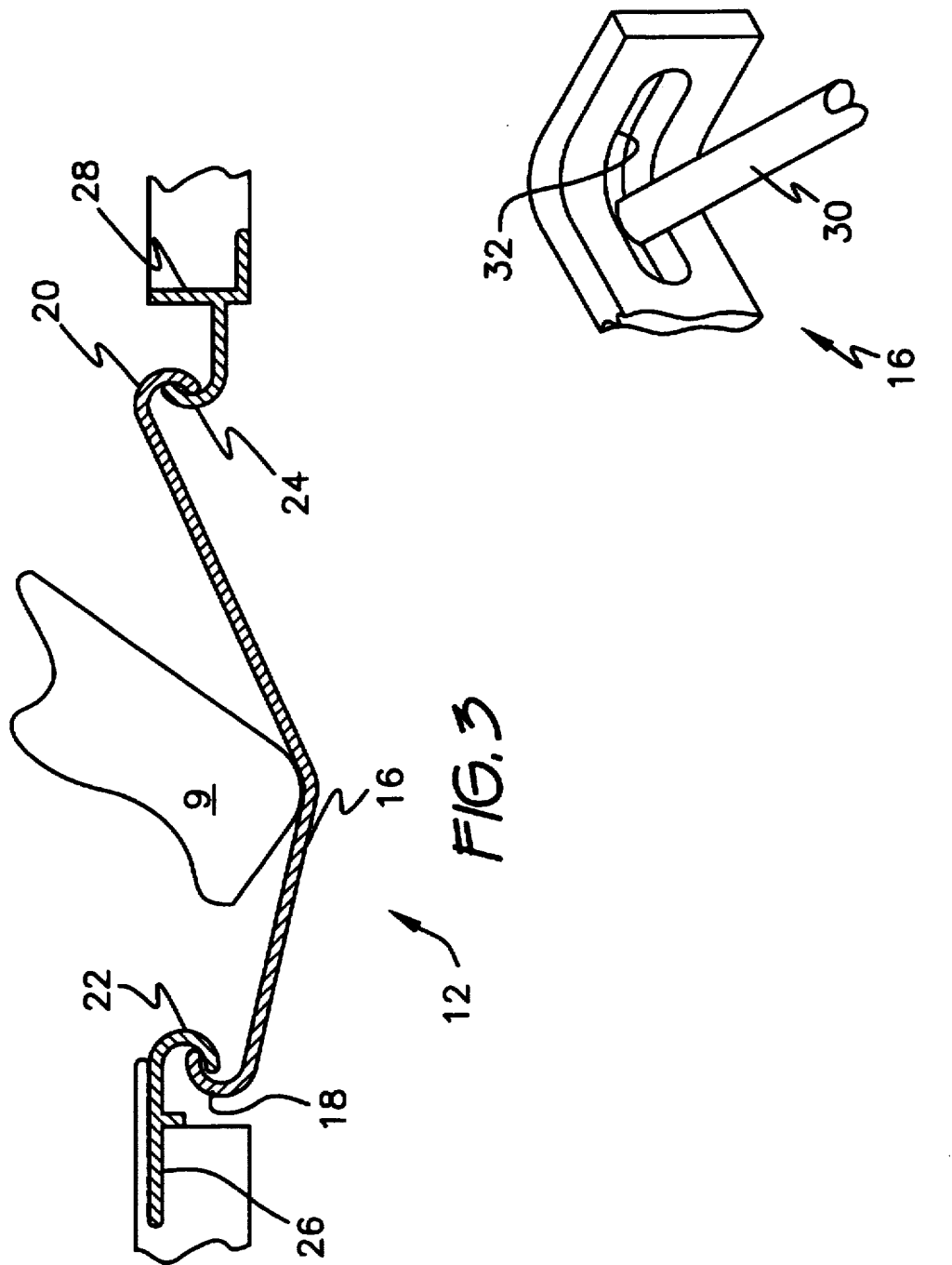

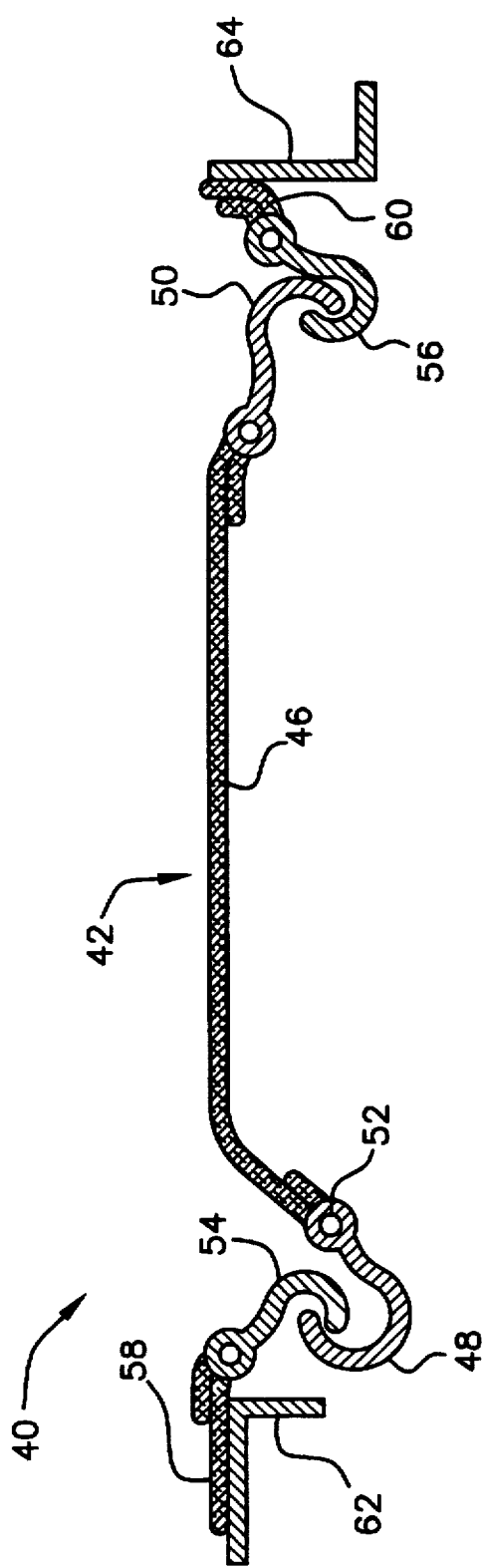
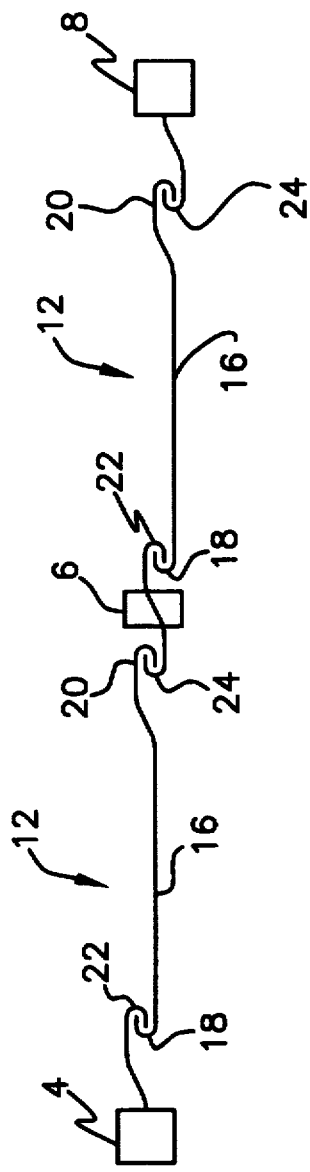
FIG. 5
FIG. 6

FULL WIDTH SIDE IMPACT BARRIER

BACKGROUND OF THE INVENTION

1. Field of the Invention

The present invention relates to an impact barrier formed in a motor vehicle for the purpose of protecting occupants of the vehicle from injury in collisions involving side impacts. More particularly, the novel impact barrier is formed in complementing sections which interlock when the doors of one side are closed to form a single impact barrier assembly spanning the full width of the vehicle.

2. Description of the Prior Art

The cabin of a passenger vehicle, particularly that of an automobile, is susceptible to being crushed during a side impact from another vehicle or an unyielding environmental object. Impact beams have been provided as integral parts of doors to increase resistance of the door to such impacts. An impact beam typically spans the width of the door of the vehicle, and is anchored at both ends, possibly in addition to periodically along the length of the impact beam, to the structure of the door.

U.S. Pat. No. 5,553,910, issued to Young H. Park on Sep. 10, 1996, describes a preferred arrangement for impact beams for a door of a motor vehicle. This arrangement includes two separate beams, one disposed above the other. However, unlike the present invention, both are fixed in place within one door. In the present invention, plural beams located in adjacent doors and fixed body panels interlock to provide a continuous barrier.

U.S. Pat. No. 4,919,473, issued to Johann Laimighofer et al. on Apr. 24, 1990, and 5,404,690, issued to Terry K. Hanf on Apr. 11, 1995, each propose a construction for an impact beam for a door or wall of a motor vehicle. U.S. Pat. No. 5,180,204, issued to Hidenori Shirasawa et al. on Jan. 19, 1993, discusses properties of steel suitable for an impact beam. In these prior art inventions, the subject impact beam is of solid, monolithic construction, suitable for a single door or fixed panel of the motor vehicle body. By contrast, the present invention provides plural, separable sections which interlock to form a continuous barrier.

None of the above inventions and patents, taken either singly or in combination, is seen to describe the instant invention as claimed.

SUMMARY OF THE INVENTION

The present invention provides a plurality of impact barriers which mechanically interlock during an impact to form a single unitary structure for resisting transmission of forces and passage by external objects during an impact to the interior of the cabin of a motor vehicle. This unitary structure spans not only a single member of the vehicle such as a door, but rather spans the entire width of the cabin of the motor vehicle. Normally, each individual impact barrier is unattached to the others. Each individual impact barrier terminates in hooks which are alignable with corresponding hooks formed in adjacent impact barriers.

In an impact, an affected barrier draws its hooks towards its midpoint responsive to its host door or corresponding structure being displaced towards the center of the cabin. The hooks of the affected barrier are drawn into engagement with the hooks of adjacent impact barriers, thereby creating a single barrier spanning the entire width of the cabin. The constituent individual impact barriers are adequately joined to resist tensile forces imposed as the united assembly of barriers is displaced towards the center of the cabin and consequently stretched.

This arrangement achieves several objectives. One is that a single member, such as a door, cannot be displaced by impact and forced into the cabin. Even in the presence of an unyielding impact beam, the door of a vehicle subjected to an impact could be torn loose from the remainder of the cabin and forced into the occupied space. Connection of the beam or barrier by the novel construction reduces likelihood of this occurrence. A second objective is that force from an impact is diffused over many points of support along the side of the cabin. Localized maximum force is thereby mitigated, with attendant reduced likelihood of intrusion of external objects into the cabin.

The barriers are arranged on each door to project fore and aft sufficiently to enable the hooks of the impact barrier of the door to overlap corresponding hooks secured to structural pillars, adjacent doors, and other structural members. Therefore, each door can be opened and closed without the novel impact barriers interfering with door operation.

Each barrier is supported on an associated cabin member, such as a door or pillar. Support need not be provided with great strength. Fore and aft ends of the barrier may be permanently anchored to the motor vehicle. Preferably, one part of the barrier, which may be a hook or may be a longitudinal member, has a predetermined yield point for breaking when a predetermined load is exceeded. This prevents the impact from transferring force in an undesirable way, such as forces which could upset or flip the vehicle over, or which would propel the entire vehicle rather than be absorbed and diffused.

There is no requirement that the impact barrier be rigid, as typically prevails in prior art impact beams. Because each segment of the impact barrier is ultimately anchored at many points along the length of the side of the cabin, longitudinal members of the impact barrier can resist the impact even if they are flexible or flaccid members. Examples of such construction include strong braided straps of natural or artificial fibers. This construction may enjoy rugged, strong construction without incurring undue weight penalties. Hooks or equivalent member for latching or connecting adjacent individual segments of the barrier may be steel or some other rigid material.

Accordingly, it is a principal object of the invention to provide an impact barrier for resisting transmission of force of an impact and passage of an external object into the cabin of a motor vehicle.

It is another object of the invention to provide an impact barrier which protects the entire length of the side of the cabin of the motor vehicle.

It is a further object of the invention to form the impact barrier in individual sections or members which engage one another during an impact, but which remain unconnected normally.

Still another object of the invention is to enable undisturbed operation of doors, hatches, and similar closures to the cabin of the motor vehicle.

An additional object of the invention is to diffuse and mitigate forces being imposed upon the cabin of a motor vehicle during an impact.

It is again an object of the invention to establish a predetermined yield point at which the impact barrier ruptures, to avoid transmitting force of an impact in an undesirable manner.

Yet another object of the invention is to provide an impact barrier which does not rely upon rigid construction.

Still a further object of the invention is to provide a strong impact barrier while minimizing weight.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic, top plan view of the environment of the invention, illustrating location of the novel impact barrier on a motor vehicle.

FIG. 2 is an exaggerated, environmental, top plan cross sectional detail view of the invention.

FIG. 3 is a view similar to that of FIG. 2, but showing an impact by an external object.

FIG. 4 is a perspective detail view of an alternative embodiment of the invention.

FIG. 5 is a view similar to that of FIG. 2, but illustrating an alternative embodiment of the invention.

FIG. 6 is a diagrammatic top plan view depicting components shown only in block form in FIG. 1.

DETAILED DESCRIPTION OF THE PREFERRED EMBODIMENTS

Prior to describing details of novel impact barrier 10, locations of components of novel impact barrier 10 are shown diagrammatically on one side of an automobile 2 in FIG. 1. Barrier 10 is located along one or both sides of automobile 2 so as to cover the cabin portion of automobile 2 continuously for the full length, as taken from left to right in FIG. 1, of the cabin. It will be understood that the opposing side of automobile 2 may be provided with corresponding structure which is omitted for brevity. The corresponding structure will include similar components as those set forth in greater detail hereinafter, and may be arranged in mirror image relative to those shown. Barrier 10 includes a first barrier segment 12, which is carried in a front door (not shown) and spans the length, again taken from left to right in FIG. 1, of the door.

Barrier segment 12 is located between two strong structural members 4, 6 of automobile 2. Structural member 4 may, for example, comprise reinforced vertical members of the front door frame, while structural member 6 may comprise a center pillar forming a vertical member of front and rear door frames. For vehicles having two doors on each side, a second barrier segment 14 is provided. Structurally, barrier segment 14 may repeat construction set forth for barrier segment 12. Barrier segment 14 is located between structural members 6, 8. Structural member 8 may comprise a vertical member of the rear door frame. Barrier 10 comprises barrier segments 12, 14 and any intervening members provided for anchorage. In the embodiment of FIG. 1, anchorage members are shown at structural members 4, 6, and 8.

Barrier 10 is enclosed within the doors and body panels of automobile 2, preferably as close to the interior of the doors and body as possible. This is shown representatively in FIG. 2, wherein the exterior of one side of the body of automobile 2 is indicated at E and the interior of the same is indicated at I. Barrier 10 is located at a height typical or conventional for conventional impact beams (not shown). This height will be selected to avoid interference with door hinges (not shown).

Barrier segment 12 is seen to comprise a longitudinal member 16 terminating in front and rear hooks 18, 20 (respectively). Longitudinal member 16 is a rigid, strong beam solidly fixed to hooks 18, 20. With the door 3 in the closed position as depicted in FIG. 2, each hook 18 or 20 is disposed in close proximity but not engaging a corresponding hook 22 or 24. These first and second doorframe hooks 22, 24 are solidly fixed to strong structural members 26, 28 anchored to structural members 4 and 6 of the door frame surrounding door 3. The door frame is either a strong structural part of the cabin of automobile 2, or is fixed to a strong structural part so as to provide adequate support to members 26, 28 in the event of an impact. Hook 18 is arranged to open towards hook 22. Similarly, hook 20 opens towards hook 24. Thus each set of hooks 18, 22 and 20, 24 form mateable pairs.

In the event of a side impact, as illustrated in FIG. 3, an impinging external object 9 will displace barrier segment 12 towards the center of the cabin or towards interior I of the door and bodywork. Longitudinal member 16 will deflect, drawing hook 18 into engagement with hook 22, and drawing hook 20 into engagement with hook 24. Actual configuration, curvature, location, and dimensions of hooks 18, 20, 22, 24 will be selected to assure that should member 16 be displaced towards the center of the cabin, hook 18 will successfully engage or interlock with hook 22, and hook 20 will successfully engage or interlock with hook 24. Force from the impact will be imposed upon hooks 22 and 24, which in turn will transmit force to structural members 26 and 29. Force is thereby diffused by distribution to structural members of automobile 2.

Hooks are not the only possible configuration of engagement members which may be employed to interlock barrier segment 12 to structural members 26, 28. Any suitable interlocking structure, such as a peg 30 and eye 32 (see FIG. 4), or other male and female structure, may serve as an engagement member in place of hooks. It is merely required that the selected engagement member have apparatus for engaging a structural member of the motor vehicle responsive to displacement of its associated barrier segment during an impact, and remaining free from engagement of the structural member when the motor vehicle is not subjected to an impact. Hooks 18 and 20 are mounted on the door in predetermined positions to allow for spacing apart of each hook 18 or 20 relative to its corresponding hook 22 or 24. Normally, there is no contact between hooks, interference of hooks with other parts of the vehicle or impact barrier 10, nor engagement between each pair of associated hooks. When an impinging external object 9 (see FIG. 3) displaces longitudinal member 16 inwardly, engagement of hooks ensues.

In the embodiment of FIG. 4, longitudinal member 16 forms eye 32 at its end. Peg 30 is securely fixed to structural member 28 (see FIG. 2). Of course, relative positions of male and female members may be reversed.

Impact beams are traditionally rigid and fabricated from steel tubing or other stock. Because the novel impact barrier 10 engages structural members of the cabin upon impact, rigidity is not required for successful operation. As shown in FIG. 5, an impact barrier 40 employs the novel principles of barrier 10, but each constituent member includes a flexible component. Barrier segment 42, which is functionally equivalent to segment 12 of FIG. 2, includes a longitudinal member 46 which is flexible. Such construction may comprise a strap or web fabricated from natural or artificial fibers, such as woven or braided nylon, stranded metallic wire, and other constructions.

Hooks 48, 50 repeat the function of corresponding hooks 18, 20 of FIG. 2, and are fabricated from steel or a similar strong, rigid material. However, hooks 48, 50 are modified to engage the strap of member 46 in any suitable way. For example, a pin 52 forming part of hook 48 is encircled by the strap of member 46. The strap is stitched, woven, or otherwise fastened to itself after encircling pin 52. This construction will be understood to apply to other flexible straps connected to hooks of barrier 40.

Hooks 48, 50 are respectively associated with hooks 54, 56. Hooks 54, 56 may be similar to hooks 22 and 24 of FIG. 2, or may be modified so that they are provided with a flexible link 58 or 60. Each flexible link 58 or 60 comprises a strap which is suitably fastened to its respective hook 54 or 56 and to a respective structural member 62 or 64 of the motor vehicle.

Each barrier segment 12 or 42 must be provided with anchorage to a structural member of the motor vehicle. Anchorage may be provided by engagement members such as hooks 22, 24, 54, 56 or by a peg and eye arrangement such as that depicted in FIG. 4. Alternatively, one end of each barrier segment 12 or 42 may be directly fastened to the structural member of the motor vehicle by a hinge or by a strong strap (neither shown). Therefore, a novel impact barrier must contain at a minimum one barrier segment, an engagement member equivalent to a hook (such as hook 18) at one end, and permanent or releasable anchorage apparatus at the other end of the barrier segment. The minimum number of constituent parts, as set forth above, would be appropriate for protecting a motor vehicle having only one door at the protected side.

For motor vehicles provided with two or more doors at the protected side, the novel construction is repeated in serial fashion to extend protection along the entire length of the protected cabin. This situation is illustrated diagrammatically in FIG. 6. Two barrier segments 12 are provided in series. Each barrier segment 12 would be anchored by hooks to structural members 4 and 6 or members 6 and 8, respectively, after an impact, as is illustrated in FIG. 3. Each of the barrier segments has a longitudinal segment 16 between the front and rear hooks 18, 20 and between the longitudinal segment 16 and the rear hook 20 is an angled portion 19. In the embodiment illustrated in FIG. 6 this angled portion 19, extending towards the exterior of the door, holds the rear hook 20 clearly out of engagement with its corresponding engaging hook 24. Of course, it would be possible to further extend the barrier by incorporation of still additional barrier segments and associated engagement members.

Protection afforded by the invention may be limited to a passenger cabin of a motor vehicle, or may extend further, if desired. For example, a freight compartment or cabin (not shown) located adjacent to a passenger cabin may be similarly protected. Although described as applying to the lateral sides of a motor vehicle, the invention is equally applicable to other sides. For example, single or double rear doors of a van may be protected by the invention.

The present invention is susceptible to variations and modifications which may be introduced thereto without departing from the inventive concept. For example, where plural barrier segments are employed, they need not all be of one type. Similarly, engagement members may vary in type, location, and construction. Attachment of an engagement member to its associated barrier segment or structural member of the vehicle may vary.

It is to be understood that the present invention is not limited to the embodiments described above, but encompasses any and all embodiments within the scope of the following claims.

I claim:

1. An impact barrier for use in a door of a vehicle where the vehicle door is surrounded by a structural frame comprising:

a barrier member disposed inside of and attached to the interior wall of the door of the vehicle having a first, front end and a second, rear end;

said barrier member including a generally straight longitudinal portion attached to the interior wall of the vehicle door and an angled portion, said generally straight longitudinal portion extending between said first, front end and said angled portion and said angled portion generally extending away from the interior wall of the door and terminating in said second, rear end distal from said generally straight longitudinal portion;

a first barrier hook located on said first, front end of said barrier member and a cooperating first doorframe hook mateable with said first barrier hook located on and extending from the surrounding structural frame proximate said first barrier hook; and a second barrier hook located on said second, rear end of said barrier member and a cooperating second doorframe hook mateable with said second barrier hook located on and extending from the surrounding structural frame proximate said second barrier hook; whereby said first and said second barrier hooks are proximate to, but not engaged by, said first and said second doorframe hooks in normal vehicle operating conditions and that in the case of a side impact said barrier member is pushed inwards against the interior door of the vehicle, said first and said second barrier hooks are pulled into engagement with said first and said second doorframe hooks, thus transferring a portion of the impact force to the structural frame.

2. The impact barrier according to claim 1, wherein said barrier member is generally horizontally disposed and rectangular.

3. The impact barrier according to claim 1, wherein said generally straight longitudinal portion attached to the interior wall of the vehicle door is removably attached to the interior wall.

4. The impact barrier according to claim 1, wherein said generally straight longitudinal portion is made up of a flexible, woven material.

* * * * *